(12) United States Patent
Reynolds et al.

(10) Patent No.: US 10,518,478 B2
(45) Date of Patent: Dec. 31, 2019

(54) ADDITIVE MANUFACTURING SYSTEMS AND METHODS

(71) Applicant: Hamilton Sundstrand Corporation, Charlotte, NC (US)

(72) Inventors: Shawn Karl Reynolds, Byron, IL (US); Sergey Mironets, Charlotte, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 355 days.

(21) Appl. No.: 15/151,311

(22) Filed: May 10, 2016

(65) Prior Publication Data
US 2017/0326806 A1    Nov. 16, 2017

(51) Int. Cl.
| | |
|---|---|
| *B29C 64/393* | (2017.01) |
| *B33Y 10/00* | (2015.01) |
| *B33Y 30/00* | (2015.01) |
| *B29C 64/30* | (2017.01) |
| *B22F 3/105* | (2006.01) |
| *B29C 64/153* | (2017.01) |
| *B29C 64/321* | (2017.01) |
| *B29C 64/205* | (2017.01) |

(52) U.S. Cl.
CPC .......... *B29C 64/393* (2017.08); *B22F 3/1055* (2013.01); *B29C 64/153* (2017.08); *B29C 64/205* (2017.08); *B29C 64/30* (2017.08); *B29C 64/321* (2017.08); *B33Y 10/00* (2014.12); *B33Y 30/00* (2014.12); *B22F 2003/1056* (2013.01); *Y02P 10/295* (2015.11)

(58) Field of Classification Search
CPC ... B29C 64/214; B29C 64/218; B29C 64/393; B29C 64/00; B29C 64/10; B29C 64/188; B29C 64/20; B29C 64/273; B29C 64/307; B29C 64/321; B29C 64/153; B29C 64/165; B33Y 10/00; B33Y 30/00
See application file for complete search history.

(56) References Cited

U.S. PATENT DOCUMENTS

| | | |
|---|---|---|
| 5,387,380 A | 2/1995 | Cima et al. |
| 8,021,138 B2 | 9/2011 | Green |

(Continued)

FOREIGN PATENT DOCUMENTS

| | | |
|---|---|---|
| DE | 4325573 A1 | 2/1995 |
| EP | 3165304 A1 | 5/2017 |
| WO | WO-2014018100 A1 | 1/2014 |

OTHER PUBLICATIONS

Marcus et al: "Solid Freeform Fabrication symposium Proceedings", AFF Symposium, Sep. 1, 1993 (Sep. 1, 1993), pp. 1-387, XP055373872, * p. 225, 2nd; p. 227, 1st; Appendix, Table A1.; p. 223-p. 236; figures 3, 4, 8*.

(Continued)

*Primary Examiner* — Stella K Yi
(74) *Attorney, Agent, or Firm* — Locke Lord LLP; Scott D. Wofsy; Georgi Korobanov

(57) ABSTRACT

A method of depositing powder in an additive manufacturing system includes driving a recoater along a drive axis and oscillating the recoater along an oscillation axis. The recoater is oscillated while the recoater is driven along the drive axis to overcome the effect of one or more particle movement restriction mechanisms for smoothing powder deposited in a build chamber of an additive manufacturing system.

16 Claims, 5 Drawing Sheets

(56) References Cited

U.S. PATENT DOCUMENTS

2004/0170765 A1 9/2004 Ederer et al.
2015/0054191 A1* 2/2015 Ljungblad ............... B22F 3/004
264/112

OTHER PUBLICATIONS

The extended European Search report received from the European Patent Office dated Oct. 2, 2017 for Application No. EP17170379.6.

* cited by examiner

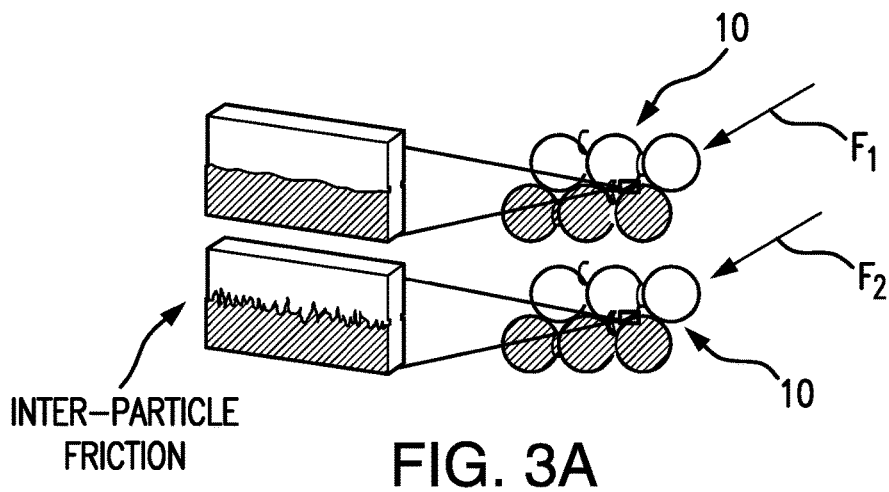
INTER-PARTICLE FRICTION
FIG. 3A
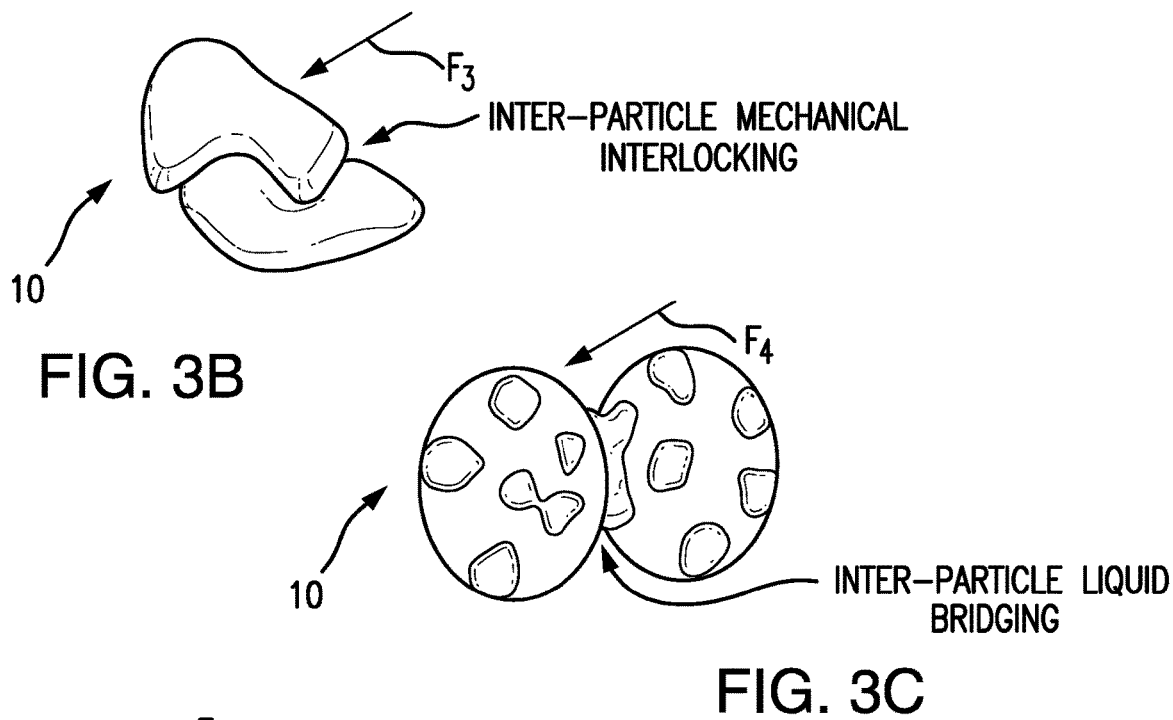
FIG. 3B
INTER-PARTICLE MECHANICAL INTERLOCKING
INTER-PARTICLE LIQUID BRIDGING
FIG. 3C
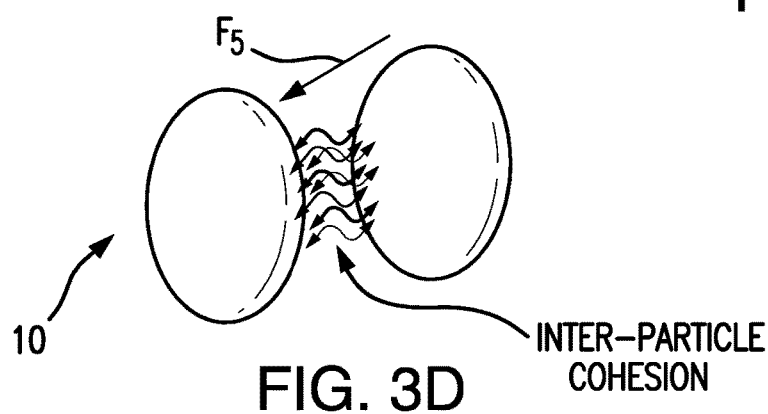
INTER-PARTICLE COHESION
FIG. 3D

ADDITIVE MANUFACTURING SYSTEMS AND METHODS

BACKGROUND OF THE INVENTION

1. Field of the Invention

The present disclosure relates generally to additive manufacturing, and more particularly to depositing powder in additive manufacturing system build chambers.

2. Description of Related Art

Additive manufacturing techniques are commonly used to fabricate articles by projecting an energy beam on a powder bed. The beam is generally moved across the powder bed such that a portion of the powder fuses, thereby forming a layer of an article. Once the layer is formed, the powder bed is refreshed by spreading new across the fused layer, and a subsequent layer formed by fusing a portion of the added powder to the underlying layer.

In some additive manufacturing techniques, the uniformity of powder spread within the build chamber can influence mechanical properties of articles produced using the technique. For example, some powders tend to clump together as the powder is spread across the fused layer. One approach to this challenge is to carefully control the shape of particulate forming the powder, such as by forming the particulate with spherical shapes, which are generally less apt to interlock and/or adhere to one another during while being spread across the fused layer. While spherically shaped particles can generally be spread with good uniformity, generating such powders can be relatively expensive and/or can require specialized powder generation equipment, like plasma rotating electrode generators, instead of more common powder generation equipment.

Such conventional methods and systems have generally been considered satisfactory for their intended purpose. However, there is still a need in the art for improved systems and methods for depositing powder in additive manufacturing system build chambers. The present disclosure provides a solution for this need.

SUMMARY OF THE INVENTION

A method of depositing powder in an additive manufacturing system includes driving a recoater along a drive axis and oscillating the recoater along an oscillation axis. The recoater is oscillated along the oscillation axis while the recoater is driven along the drive axis to overcome the effect of one or more particle movement restriction mechanisms for smoothing powder deposited in a build chamber of an additive manufacturing system.

In certain embodiments, oscillating the recoater along the oscillation axis can include overcoming inter-particle forces associated with particle movement restriction mechanisms like friction, interlock, liquid bridging, and/or cohesion. The method can include smoothing the powder by oscillating the recoater along the oscillation axis. The powder can have particulate with titanium or alloys thereof. The powder can have particulate with non-spherical shapes. The recoater can smooth the powder while pitched or yawed relative to the drive axis.

In accordance with certain embodiments, oscillating the recoater can include oscillating the recoater as the recoater reciprocates along the drive axis. Oscillating the recoater can include oscillating the recoater along the drive axis. Oscillating the recoater can include oscillating the recoater in a direction angled relative to the drive axis. Oscillating the recoater can include oscillating the recoater laterally relative to the drive axis. Oscillating the recoater can include oscillating the recoater vertically relative to the direction of gravity. One or more of the oscillation frequency, oscillation direction, and oscillation magnitude can be selected according to a constitution of the powder or size of the additive manufacturing system build chamber.

It is also contemplated that, in accordance with certain embodiments, oscillating the recoater can include vibrating the recoater. The recoater can be vibrated in the direction of the drive axis, at an angle relative to the drive axis, laterally relative to the drive axis, and/or vertically relative to the direction of gravity. The method can include selecting one or more of a vibration frequency, vibration direction, and/or a vibration magnitude based on a constitution of the powder or size of an additive manufacturing system build chamber. The vibration can be in a frequency range between about five (5) hertz and about 300 hertz.

An additive manufacturing system includes a recoater having a drive axis and an oscillation axis, a build chamber disposed along the drive axis, and a drive module operably connected to the recoater to drive the recoater along the drive axis. An oscillation module is operably connected to the recoater to oscillate the recoater along the oscillation axis. A control module is communicative with the oscillation module and is configured to select one or more of an oscillation direction, oscillation frequency, and oscillation magnitude according to constitution of a powder in the build chamber. In certain embodiments, the oscillation axis can be aligned with or angled to the drive axis. The recoater can have at least two degrees of freedom. The recoater can be a non-rigid recoater, and can include a blade or a roller. A pitching or a yawing module can be operably connected to the recoater.

An additive manufacturing system includes a recoater having a drive axis and an oscillation axis, a build chamber disposed along the drive axis, and a drive module operably connected to the recoater to drive the recoater along the drive axis. An vibration module is operably connected to the recoater to vibrate the recoater along the oscillation axis and a control module is communicative with the vibration module to select one or more of an vibration, direction, frequency, and magnitude according to constitution of a powder in the build chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 3A-3D show force exerted upon discrete particles of a powder disposed within the additive manufacturing system of FIG. 1, showing the forces overcoming particle movement restriction mechanisms of the powder, according to embodiments;

DETAILED DESCRIPTION OF THE PREFERRED EMBODIMENTS

Figure 1:
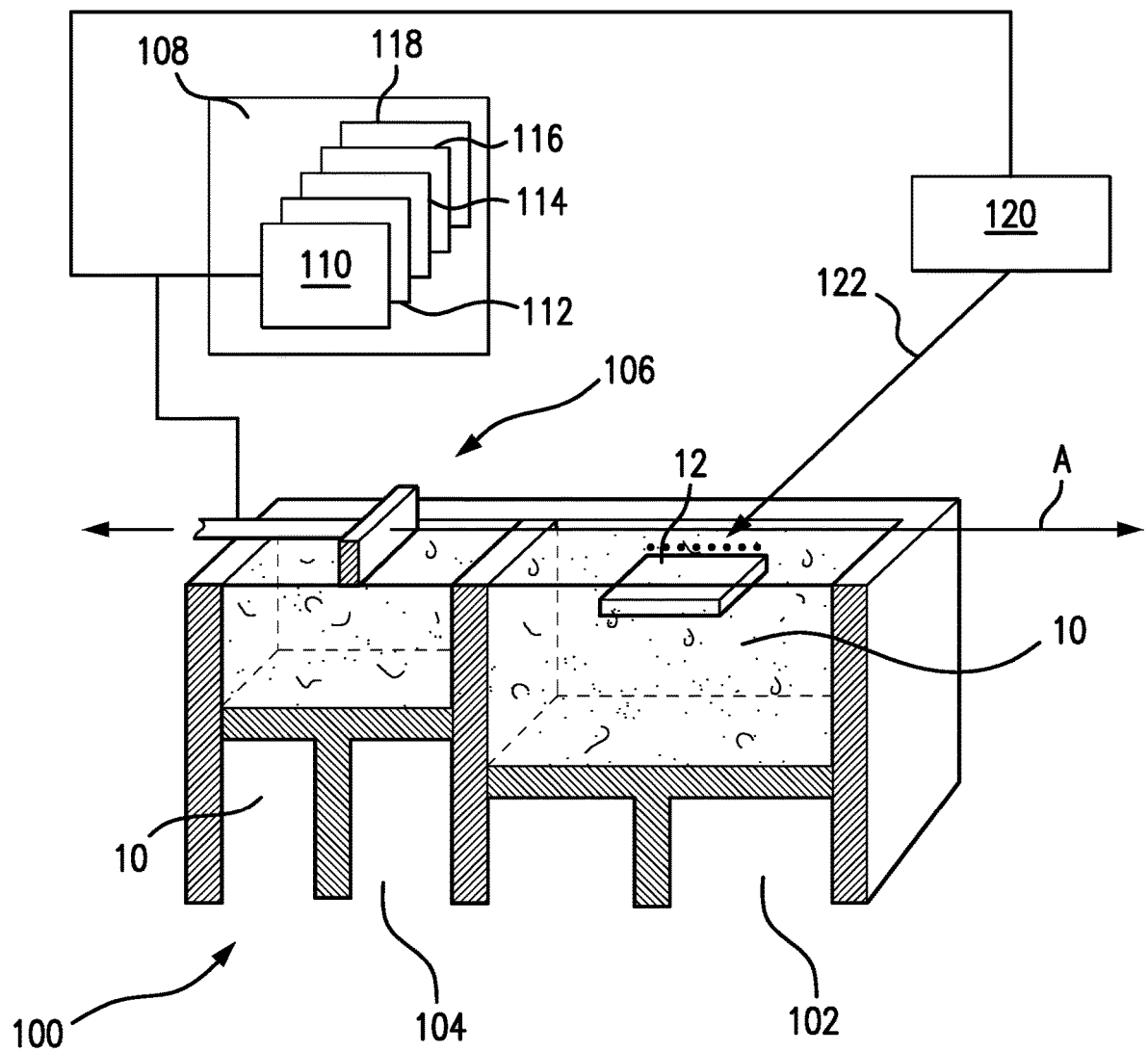
FIG. 1 is a schematic perspective view of an exemplary embodiment of an additive manufacturing system constructed in accordance with the present disclosure, showing a recoater.

Reference will now be made to the drawings wherein like reference numerals identify similar structural features or aspects of the subject disclosure. For purposes of explanation and illustration, and not limitation, a partial view of an exemplary embodiment of an additive manufacturing system in accordance with the disclosure is shown in FIG. 1 and is designated generally by reference character 100. Other embodiments of additive manufacturing systems and methods of depositing powder in additive manufacturing systems in accordance with the disclosure, or aspects thereof, are provided in FIGS. 2-7, as will be described. The systems and methods described herein can be used for smoothing powder in additive manufacturing system build chambers, though the present disclosure is not limited to powder smoothing or to additive manufacturing in general.

FIG. 1 schematically illustrates additive manufacturing system 100. Exemplary additive manufacturing system 100 may include a stereolithographic apparatus, a direct selective laser sintering apparatus, an electron beam sintering apparatus, an electron beam melting apparatus, a laser engineered net shaping apparatus, a laser net shape manufacturing apparatus, a direct metal deposition apparatus, or a direct metal laser sintering apparatus by way of non-limiting example.

Additive manufacturing system 100 includes a build chamber 102, a charging module 104, a recoater 106, and an energy beam source 120. Build chamber 102 and charging module 104 are disposed along a drive axis A. Recoater 106 is movable along drive axis A between charging module 104 and build chamber 102 to smooth a powder 10 provided by charging module 104 in build chamber 102. Energy beam source 120 is configured to project an energy beam 122 over powder 10, thereby fusing a portion of powder 10 into successive layers of an article 12.

Additive manufacturing system 100 also includes one or more of a control module 108, a drive module 110, an oscillation module 112, a vibration module 114, and a pitching/yawing module 116. Control module 108 is communicative with drive module 110, oscillation module 112, vibration module 114, pitching/yawing module 116, and/or energy beam source 120. Drive module 110 is operably connected to recoater module 106 and is configured and adapted to drive recoater 106 along drive axis A. Oscillation module 112 is operably connected recoater 106 and is configured and adapted to oscillate recoater 106 with one or more oscillatory components along an oscillation axis B (shown in FIG. 4) while recoater 106 is driven along drive axis A. Vibration module 114 is operably connected recoater 106 and is configured and adapted to vibrate recoater 106 with one or more vibratory components along oscillation axis B while recoater 106 is driven along drive axis A. Pitching/yawing module 116 is operably connected to recoater 106 is configured and adapted to pitch or yaw recoater 106 relative to drive axis A.

Figure 2:
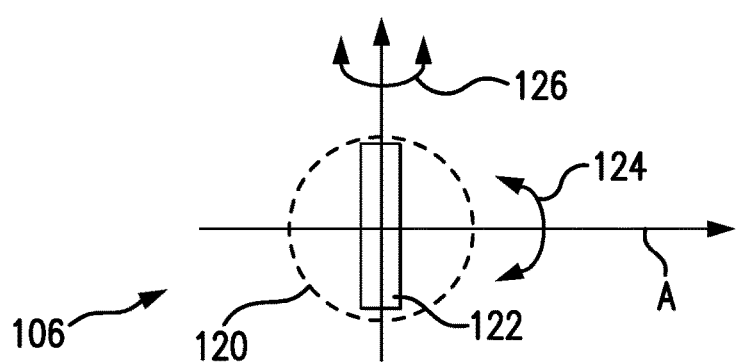
FIG. 2 is schematic side elevation view of the recoater of FIG. 1, showing recoaters including a non-rigid blade and a non-rigid roller, respectively, according to embodiments.

With reference to FIG. 2, recoater 106 is shown. Recoater 106 includes one or more of a roller 120 and a blade 122, which may be rigid or non-rigid in construction, and which may have two or more degrees of freedom. For example, recoater 106 is movable along both drive axis A and oscillation axis B. As will be appreciated by those of skill in the art in view of the present disclosure, it is contemplated that oscillatory movement of recoater 106 may include to and from movement along a single axis, e.g., drive axis A, oscillation axis B, or relative to the direction of gravity, whereas vibratory movement of recoater 106 may be in two or more directions, for example having a movement component in two directions including drive axis A, oscillation axis B, and/or the direction of gravity.

Pitching/yawing module 118 is configured and adapted to pitch or yaw recoater 106 relative to drive axis A at a pitch angle 124 and/or a yaw angle 126. Pitch angle 124 and/yaw angle 126 can be during a given movement of recoater 106 along drive axis A across build chamber 102. Pitch angle 124 and/or yaw angle 126 can be varied, and in embodiments continuously varied, are recoater 106 moves along drive axis A. Varying pitch angle 124 and/or yaw angle 126 can change the direction of force applied to particles while smoothing, improving smoothing by increasing the tendency of particulate forming powder 10 to separate from one another.

Referring the FIGS. 3A-3D, powder 10 has a constitution influenced by the discrete particles of constitution characterized by one or more of size (or size distribution), shape (e.g., spherical, irregular, ellipsoid, jagged, etc.), and composition (e.g., titanium-containing, etc.). In certain embodiments the particulate forming powder 10 may have a composition that includes titanium. The particulate forming powder 10 may have a non-spherical shape. The particulate forming powder 10 may have a particulate size, e.g., a mean particle size, that is between about forty (40) microns and about fifty (50) microns is size. As will be appreciated by those of skill in the art in view of the present disclosure, the one or more of the particle composition, shape, and size may influence the particle movement restriction mechanism of the powder.

With respect to FIG. 3A, frictional adherence between particles of an exemplary powder having spherical shape are shown being overcome by an oscillatory or vibratory force $F_1/F_2$. With respect to FIG. 3B, adherence from mechanical interlock of irregularly-shaped (e.g., jagged) particles of an exemplary powder by an oscillatory or vibratory force $F_3$. With respect to FIG. 3C, adherence from liquid bridging between particles of an exemplary powder are shown being overcome by an oscillatory or vibratory force $F_4$. With respect to FIG. 3D, adherence from cohesion between particles of an exemplary powder 10 are shown being overcome by an oscillatory or vibratory force $F_5$. Overcoming the forces associated with one or more of the illustrated exemplary particle movement restriction mechanisms renders powder 10 more apt to smooth uniformly during spreading (i.e. recoating) by fluidizing the particulate. Fluidization of particulate forming powder 10 potentially improves the mechanical characteristics of articles constructed from the smoothed powder, e.g., article 12 (shown in FIG. 1).

It is contemplated that the oscillation or vibratory motion of recoater 106 (shown in FIG. 1) be selected according to a powder movement restriction mechanism of powder 10. For example, one or more of oscillation frequency, oscillation direction, and/or oscillation magnitude may be selected by controller 106 according to an association with a particular powder constitution and stored in a module 118, which may be a lookup table by way of non-limiting example. One or more of a vibration frequency, vibration direction, and/or vibration magnitude may be selected by controller 106 according to a predetermined association with a particular powder constitution, which is stored in module 118 as a lookup table. As will be appreciated by those of skill in the art in view of the present disclosure, the associations can be arrived at through experimentation for a given additive manufacturing technique, powder constitution, and/or build chamber size. In an exemplary embodiment, oscillating recoater 106 includes vibrating recoater 106 with a frequency that is between about five (5) hertz and about 300 hertz, which can improve the uniformity of powders including titanium and/or powder having particulate of non-spherical shapes.

Figure 4:
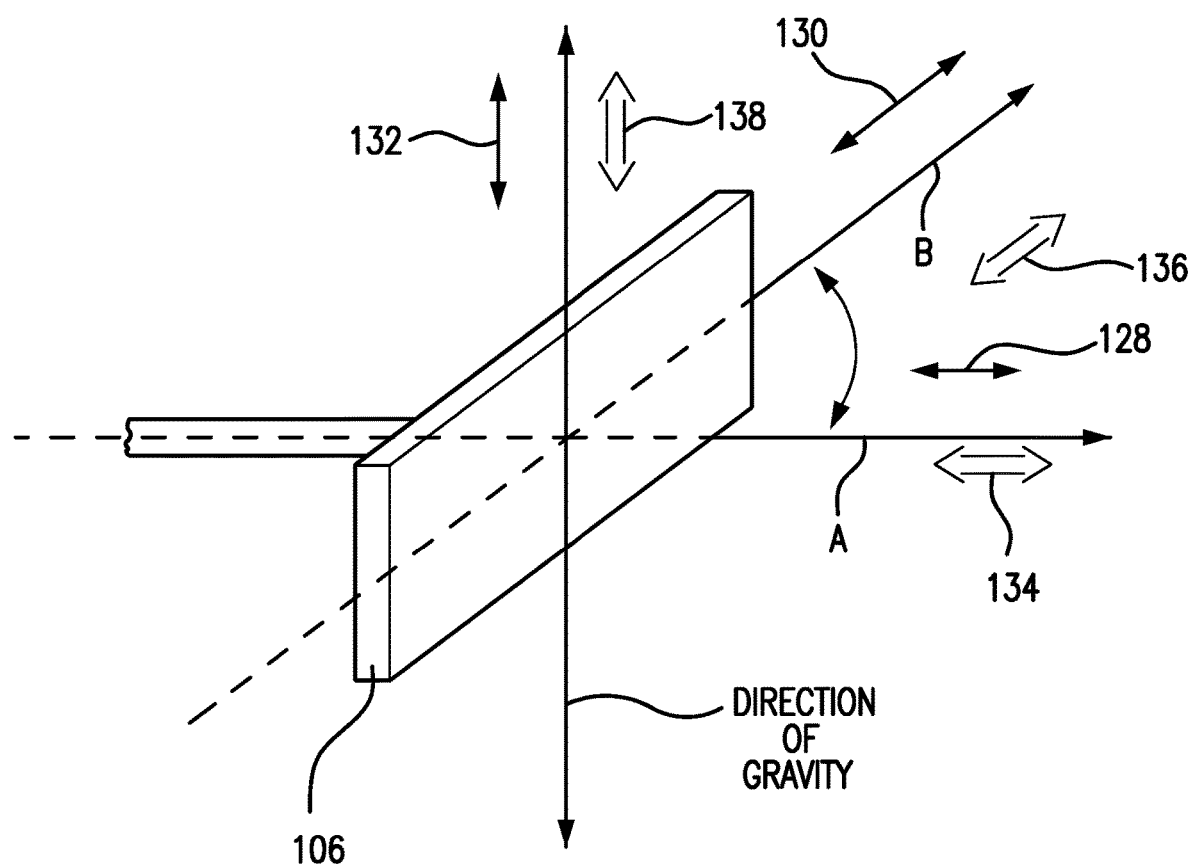
FIG. 4 is a is a schematic view of the recoater of FIG. 1, showing oscillation and vibration of the recoater, according to embodiments.

With reference to FIG. 4, recoater 106 is disposed along drive axis A and defines an oscillation axis B. Recoater 106 has at least two degrees of freedom, a first degree of freedom being disposed along drive axis A and a second degree of freedom being disposed along oscillation axis B. In certain embodiments, recoater 106 is configured and adapted to oscillate along oscillation axis B while recoater 106 is driven along drive axis A. In this respect recoater 106 may oscillate with an oscillation component 128 that is aligned relative to drive axis A. Recoater 106 may oscillate with an oscillation component 130 that is oriented laterally relative to the direction of gravity. Recoater 106 may oscillate with an oscillation component 132 that in oriented vertically relative to the direction of gravity. The orientation, magnitude, and frequency of the oscillation may be selected according to one or more of the particle movement restriction mechanism of the particulate forming the powder being smoothed within build chamber 102 (shown in FIG. 1).

In accordance within certain embodiments, recoater 106 may alternatively or additionally be configured and adapted to vibrate along oscillation axis B while recoater 106 is driven along drive axis A. The vibration may have a vibratory component 134 that is aligned relative to drive axis A. The vibration may have a vibratory component that is not aligned relative to the drive axis A. For example, the vibration may have a vibratory component 136 that is oriented laterally relative to the direction of gravity. The vibration may have a vibratory component 138 that is oriented vertically relative to the direction of gravity. The orientation, magnitude, and frequency of the vibration may be selected according to one or more of the particle movement restriction mechanism (shown in FIGS. 3A-3D) of the particulate forming powder 10 as it is smoothed within build chamber 102 (shown in FIG. 1).

Figure 5:
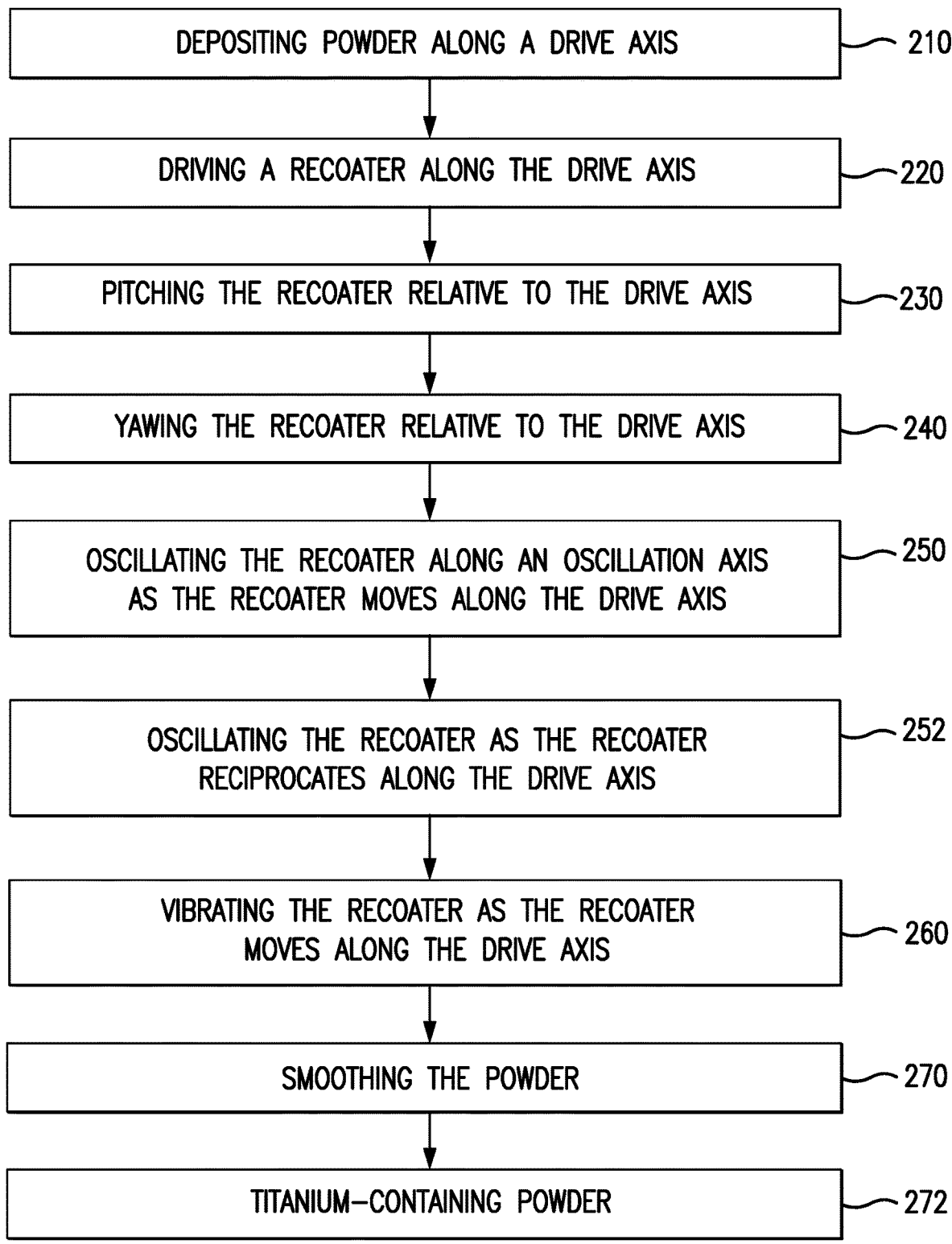
FIG. 5 is a diagram of a method of depositing powder in an additive manufacturing system, showing steps of the method.

Referring to FIG. 5, a method 200 of depositing powder in an additive manufacturing system build chamber is shown. Method 200 includes depositing powder, e.g., powder 10 (shown in FIG. 1) along a drive axis, e.g., drive axis A (shown in FIG. 1), as shown with box 210. The powder can include titanium, may have particle having non-spherical shape, and sizes in the range of forty (40) microns and about fifty (50) microns.

Method 200 includes driving the recoater along the drive axis, as shown with box 220. As the recoater is driven along the drive axis, the recoater may be pitched relative to the drive axis, as shown with box 230. As the recoater is driven along the drive axis, the recoater may be yawed relative to the drive axis, as shown with box 240. The yaw and/or pitch angle may be selected to overcome an attribute of the particle that otherwise limits the ability of the recoater to smooth the powder in the build chamber, such as particle size, particle composition, and/or particle shape. The yaw angle and/or pitch angle may be selected to overcome one or more particle movement restriction mechanisms of the powder, such as friction, mechanical interlocking, liquid bridging, and inter-particle cohesion, thereby allowing the recoater to smooth the powder layer deposited in the build chamber. As the recoater is driven the along the drive axis the recoater may be oscillated, as shown with box 250. As the recoater is driven along the drive the recoater may be vibrated, as shown with box 260. It is contemplated that the oscillation and or vibration be continuous as the recoater recoats the build chamber.

Figure 6:
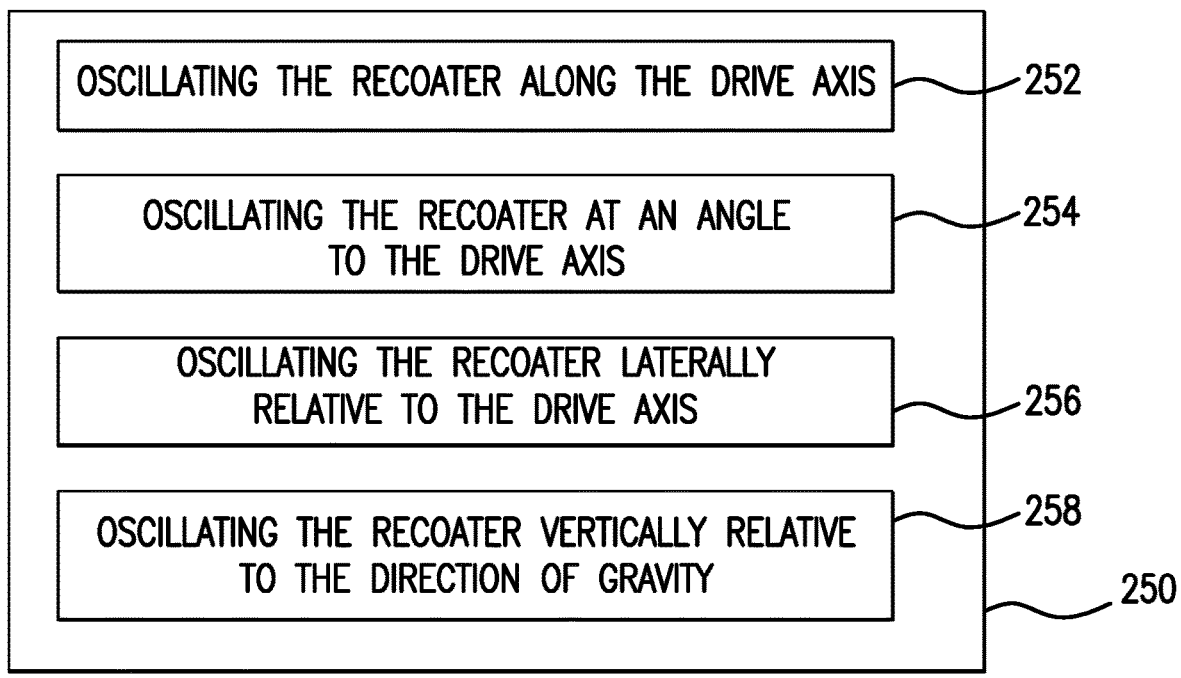
FIG. 6 is a diagram showing the method of FIG. 4, showing steps for oscillating a recoater to smooth powder deposited in an additive manufacturing system build chamber, according to embodiments.

With reference to FIG. 6, oscillating 250 the recoater can include oscillating the recoater along the oscillation axis as the recoater is driven along the drive axis. The oscillation may have an oscillation component that is in a direction that is aligned to the drive axis, as shown with box 252. The oscillation may have an oscillation component that is in a direction that is not aligned to the drive axis, as shown with box 254. Oscillation may be with a lateral component relative to the direction of gravity, as shown with box 256. Oscillation may be with a vertical component relative to the direction of gravity, as shown with box 258.

One or more of the oscillation direction, magnitude, and/or frequency can be selected according to the constitution of the powder smoothed by the recoater, such as based upon the material composition of the particulate, the size of the particulate forming the particulate, and/or the shape of particles forming the powder, as shown with box 258. The oscillation direction and/or magnitude can be selected to overcome one or more particle movement restriction mechanisms of the powder, such as friction, mechanical interlocking, liquid bridging, and inter-particle cohesion, thereby allowing the recoater to smooth the powder layer deposited in the build chamber.

Figure 7:
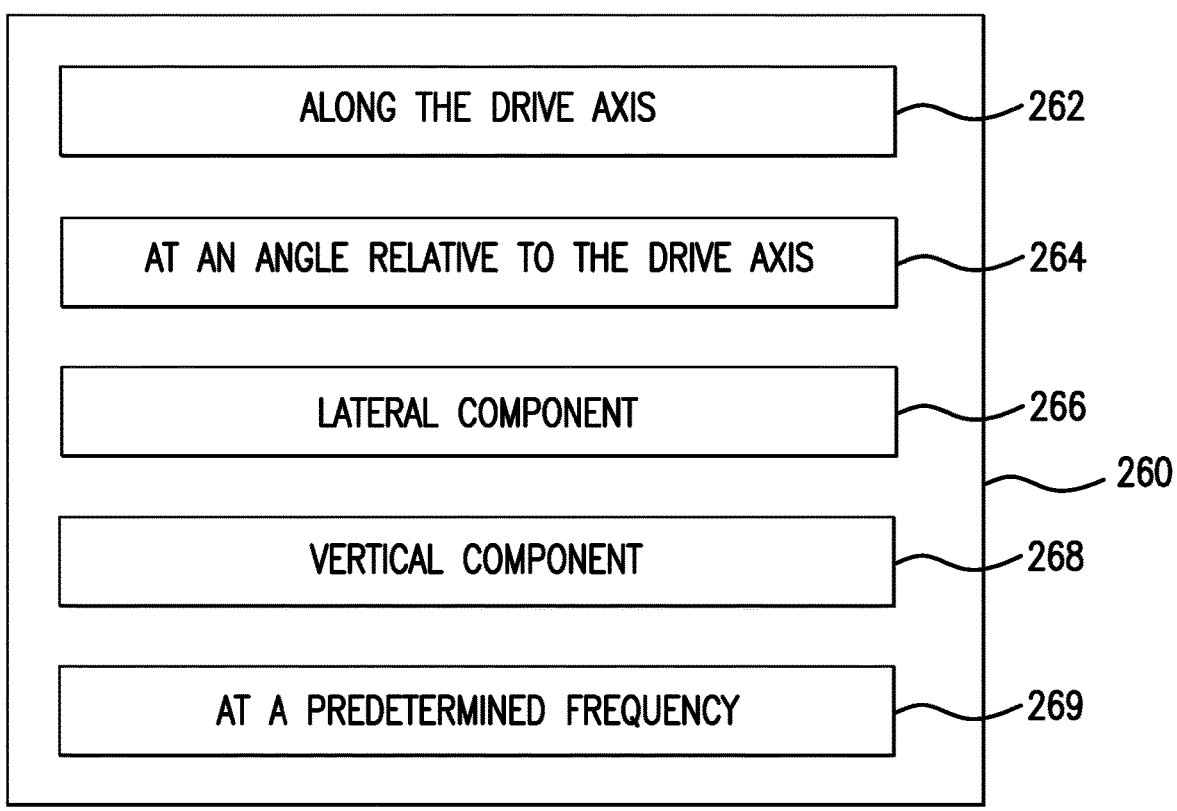
FIG. 7 is a diagram showing the method of FIG. 4, showing steps for vibrating a recoater to smooth powder deposited in an additive manufacturing system build chamber, according to embodiments.

Referring to FIG. 7, vibrating 260 the recoater may include vibrating the recoater with a vibratory component extending long the drive axis, as shown with box 262. Vibrating the recoater may include vibrating the recoater with a vibratory component that is at an angle relative to the drive axis, as shown with box 264. The recoater can be vibrated with a vibratory component that is lateral relative to the drive axis, as shown with box 266. The recoater can be vibrated with a vertical component relative to the direction of gravity, as shown with box 268.

One or more of the vibratory direction, magnitude, and/or frequency can be selected according to the constitution of the powder smoothed by the recoater, such as based upon the material composition of the particulate, the size of the particulate forming the particulate, and/or the shape of particles forming the powder, as shown with box 269. The vibratory direction and/or magnitude can be selected to overcome one or more particle movement restriction mechanisms of the powder, such as friction, mechanical interlocking, liquid bridging, and inter-particle cohesion, thereby allowing the recoater to smooth the powder layer deposited in the build chamber.

The methods and systems of the present disclosure, as described above and shown in the drawings, provide for additive manufacturing methods and systems with superior properties including the capability to smooth powders with non-spherically shaped particulate within the build chamber of an additive manufacturing system, reducing the manufacturing costs and complexity of certain types of powder feedstock for additive manufacturing techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of depositing powder in an additive manufacturing system, comprising:
   driving a recoater along a drive axis;
   oscillating the recoater along an oscillation axis while driving the recoater along the drive axis to overcome an effect of one or more particle movement restriction mechanisms and smooth the powder in a build chamber of an additive manufacturing system; and
   pitching the recoater at pitch angle relative to the drive axis and yawing the recoater at a yaw angle relative to the drive axis.

2. The method as recited in claim 1, wherein oscillating the recoater further comprises overcoming one or more of inter-particle friction, inter-particle interlocking, inter-particle liquid bridging, and inter-particle cohesion.

3. The method as recited in claim 1, wherein oscillating the recoater comprises oscillating the recoater along the drive axis.

4. The method as recited in claim 1, wherein oscillating the recoater comprises oscillating the recoater in a direction angled relative to the drive axis.

5. The method as recited in claim 1, wherein oscillating the recoater comprises oscillating the recoater laterally relative to the drive axis.

6. The method as recited in claim 1, wherein oscillating the recoater comprises oscillating the recoater vertically relative to the direction of gravity.

7. The method as recited in claim 1, further comprising selecting at least one of an oscillation frequency, an oscillation direction, and an oscillation magnitude is based on a constitution of the powder or size of an additive manufacturing system build chamber.

8. The method as recited in claim 1, wherein oscillating the recoater comprises vibrating the recoater.

9. The method as recited in claim 8, wherein vibrating the recoater comprises at least one of (a) vibrating the recoater in the direction of the drive axis, (b) vibrating the recoater at an angle relative to the drive axis, (c) vibrating the recoater laterally relative to the drive axis, and (d) vibrating the recoater vertically relative to the direction of gravity.

10. The method as recited in claim 8, wherein vibrating the recoater comprises selecting at least one of a vibration frequency, vibration direction, and a vibration magnitude based on a constitution of the powder or size of an additive manufacturing system build chamber.

11. The method as recited in claim 1, wherein oscillating the recoater comprises vibrating the recoater with a frequency that is between about five (5) hertz and about 300 hertz.

12. The method as recited in claim 1, wherein oscillating the recoater further comprises oscillating the recoater as the recoater reciprocates along the drive axis.

13. The method as recited in claim 1, further comprising smoothing a powder containing titanium particulate using the recoater.

14. The method as recited in claim 1, further comprising pitching the recoater relative to the drive axis.

15. The method as recited in claim 1, further comprising yawing the recoater relative to the drive axis.

16. A method of depositing powder in an additive manufacturing system, comprising:
    driving a recoater along a drive axis;
    oscillating the recoater along an oscillation axis while driving the recoater along the drive axis to overcome an effect of one or more particle movement restriction mechanisms and smooth the powder in a build chamber of an additive manufacturing system;
    pitching the recoater relative to the drive axis; and
    yawing the recoater relative to the drive axis.

* * * * *